United States Patent
Huang et al.

(10) Patent No.: US 8,250,996 B2
(45) Date of Patent: Aug. 28, 2012

(54) PROCESS AND APPARATUS FOR BURNING COAL INSTEAD OF OIL

(76) Inventors: Zhongcheng Huang, Beijing (CN); Peilan Wang, Beijing (CN); Zhigang Huang, Beijing (CN)

(*) Notice: Subject to any disclaimer, the term of this patent is extended or adjusted under 35 U.S.C. 154(b) by 996 days.

(21) Appl. No.: 12/230,878

(22) Filed: Sep. 5, 2008

(65) Prior Publication Data
US 2010/0028818 A1 Feb. 4, 2010

(30) Foreign Application Priority Data
Aug. 1, 2008 (CN) .......................... 2008 1 0135361

(51) Int. Cl.
F23B 90/06 (2011.01)
C10L 5/02 (2006.01)

(52) U.S. Cl. ............ 110/342; 110/230; 44/592; 44/607; 44/608; 44/620

(58) Field of Classification Search .................. 110/229, 110/230, 231, 342, 345
See application file for complete search history.

(56) References Cited

U.S. PATENT DOCUMENTS

| | | | | |
|---|---|---|---|---|
| 3,963,641 A * | 6/1976 | Pockrandt ...................... 252/373 |
| 4,162,655 A * | 7/1979 | Bozdech et al. .............. 110/212 |
| 4,165,970 A * | 8/1979 | Rudolph et al. .............. 110/229 |
| 4,430,094 A * | 2/1984 | Gorzegno ...................... 110/229 |
| 4,498,909 A * | 2/1985 | Milner et al. .................. 110/229 |
| 4,794,870 A * | 1/1989 | Visvesvaraya ................ 110/187 |
| 5,069,685 A * | 12/1991 | Bissett et al. .................. 110/229 |
| 5,139,535 A * | 8/1992 | Strickland et al. ................ 48/76 |
| 5,192,338 A * | 3/1993 | Waugh et al. ................... 44/627 |
| 5,666,890 A * | 9/1997 | Craig ............................. 110/229 |
| 6,807,914 B2 * | 10/2004 | Leisse et al. .................. 110/106 |
| 7,775,791 B2 * | 8/2010 | Swanson et al. .......... 110/104 B |
| 2008/0141672 A1 * | 6/2008 | Shah et al. ....................... 60/648 |

FOREIGN PATENT DOCUMENTS

CN 89103246.0 11/1990

* cited by examiner

Primary Examiner — Kenneth Rinehart
Assistant Examiner — David J Laux
(74) Attorney, Agent, or Firm — Foley & Lardner LLP

(57) ABSTRACT

The present invention provides a process for burning coal instead of oil comprising the stages of coal gasification, gas combustion and optionally gas purification, utilization of residual heat of flue gas and flue gas discharge. The present invention further provides an apparatus for burning coal instead of oil. By present invention, the fuel cost for an oil-burning apparatus can be reduced by about four-fifths, so the resources of oil and natural gas can be saved either. Furthermore, the present invention has the advantages such as good reliability, high heat efficiency, high level of automation, high return on investment and good environmental benefits.

13 Claims, 2 Drawing Sheets

PROCESS AND APPARATUS FOR BURNING COAL INSTEAD OF OIL

Figure 1:
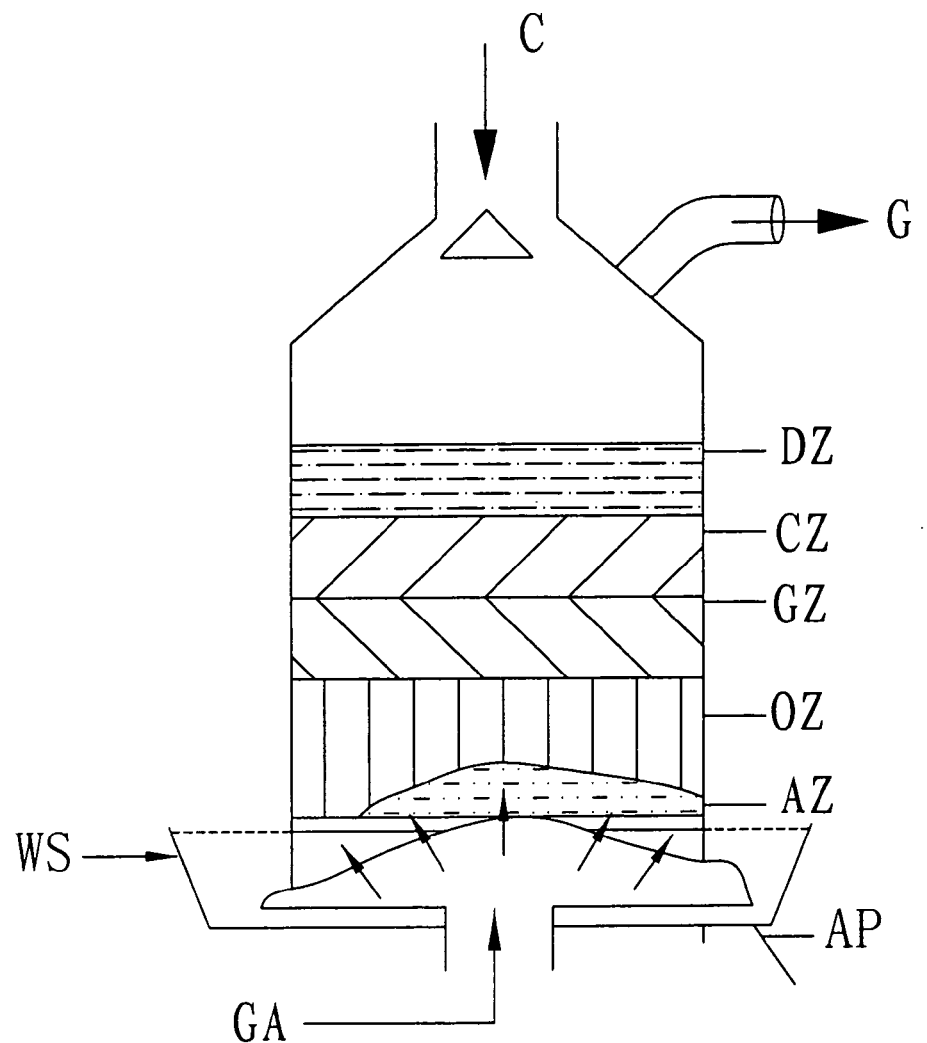

This application claims priority to Chinese Application No. 2008101035361, filed Aug. 1, 2008, the disclosure of which is hereby incorporated by reference in its entirety.

TECHNICAL FIELD

The present invention relates to a process for burning coal instead of oil, particularly for burning coal instead of oil in the steam injection boiler or heating furnace for heavy oil thermal recovery, further to an apparatus for burning coal instead of oil for carrying out said process.

BACKGROUND ART

In the domestic reserves of fossil fuels, coal is of 96.7%, oil is of 1.6%, and natural gas is of 1.7%, so the proportion of coal in the domestic energy consumption is always of about 70%. Because the reserves of oil and natural gas are not very abundant, since 1993 China had become an oil import country from an oil export country with yearly increasing import quantum, and in 2007 the net crude oil import quantum of China had been up to 177.57 million tons.

Presently, oil is the main fuel in domestic industries such as oil recovery, glass industry, ceramic industry, mechanical industry and the like at a yearly oil consumption of about 60 million tons. If coal could be used regarding this oil consumption, a benefit of more than 220 billions RMB could be expected, furthermore, a sum of foreign exchanges of about 43 billion USA$ for importing said oil could be saved. And in the world the sum of oil consumption in above-mentioned industries is as much as scores times of that in China.

In July 2007 International Energy Agency warned that the whole globe will encounter a crisis of oil supply in five years and at that time the oil price will be increased to a new record. In May 2008, the oil price was up to 130 USA$ per barrel.

One feasible way to cope with the "crisis of oil supply" is to recover the abundant heavy oil, which had been ignored in the past, however, during the "heavy oil thermal recovery" lots of steam at elevated temperature and pressure need to be injected into oil wells. And so far in the world all of the steam injection boilers or heating furnaces for heavy oil thermal recovery burn oil or natural gas as fuels, which comprise 8-12% of the recovered oil production.

In contrast, in the world coal reserves are much more abundant than oil reserves, but the coal price is less than one fifth of the oil price. Thus, using coal instead of oil, particularly those oil fuels in above-mentioned industries, will bring about significant economic and social benefits. However, in comparison with oil, coal has poor combustion properties, which are far from technical requirements in steam injection boilers, ceramic and glass kilns as well as kilns for heat-treating metals in mechanical industry. Thus, a lot of technologies are needed for using coal instead of oil.

It was reported that in the world most of the gas-burning boilers burn high calorific value gas fuels such as natural gas, liquefied gas and the like having a lower heating value above 32 MJ/Nm$^3$ to obtain a stable combustion, and hot low calorific value gas is rarely used; furthermore, in the world most of the gas-burning boilers use positive pressure combustion systems at high pressure, double-normal temperature and small volume, for instance, a combustion system wherein the gas is at a pressure of more than 2500 Pa (gauge), the pressure inside the furnace is positive, the gas consumption volume for each burner is less than 3500 m$^3$ per hour as well as both the gas and the combustion air are at normal temperature, so that to ensure homogeneous mixture between the gas and the combustion air to obtain a stable combustion.

One way for using coal instead of coal is using coal-derived gas instead of oil, for instance, Chinese patents ZL89103246, ZL94225393 and ZL99248296 etc disclosed the technology about gas-generated furnaces and coal gasification. However, there are a few reports about the process and apparatus for burning coal-derived gas instead of oil fuel for heavy oil thermal recovery, that is to say, such technologies are far from established yet.

SUMMARY OF THE INVENTION

The object of the present invention is to further improve the technology for burning coal instead of oil in the prior art. Specifically, the present invention provides a process and an apparatus for burning hot low calorific value coal-derived gas instead of oil. The present invention is more favorable to utilize energy comprehensively, so that to achieve energy conservation, emission reduction and consumption reduction.

More specifically, the present invention provides a process for burning coal instead of oil comprising the following stages:

coal gasification, wherein feeding coal and gasifying agent into a fixed bed gas-generated furnace and gasifying the coal to generate a hot low calorific value gas having a lower heating value in range of 5.02-6.66 MJ/Nm$^3$, when anthracite is used, the hot gas has a lower heating value in range of 5.02-5.65 MJ/Nm$^3$, and when bitumite is used, the hot gas has a lower heating value in range of 5.65-6.66 MJ/Nm$^3$, and a temperature selected above the dew point of the mixture of tar and steam therein, and the gasifying agent is a steam-saturated air; and gas combustion, wherein introducing the generated hot gas into a burner used in steam injection boiler or heating furnace for heavy oil thermal recovery and burning the hot gas therein under a vacuum in range of 50-150 Pa, preferably 80-120 Pa, by mixing with a combustion air, which is introduced into said burner after being preheated to a temperature in range of 160-250° C., preferably 180-230° C.; and optionally the following stages:

gas purification, wherein the hot gas generated in the fixed bed gas-generated furnace is introduced into a dry purifying means to be purified and then introduced into the burner to be burned;

utilization of residual heat of flue gas, wherein the flue gas generated during combustion in the burner is introduced into a flue gas heat exchanger to preheat the combustion air with the residual heat of the flue gas; and flue gas discharge, wherein the flue gas after preheating the combustion air is discharged into a chimney via a flue gas-discharging blower at such a rate that the pressure inside the steam injection boiler or heating furnace is maintained at the vacuum.

Furthermore, the present invention provides an apparatus for burning coal instead of oil comprising:

a fixed bed gas-generated furnace, wherein the coal is gasified in the presence of a gasifying agent to generate a hot low calorific value gas, the fixed bed gas-generated furnace has a fixed furnace body, a dry furnace top, a rotary tower grate, a continuous ash-slag discharging structure with a stepless regulated rate and a water jacket covering its entire external wall, the gasifying agent is blown thereinto via a check valve at the bottom of the furnace, the feed coal for gasification is fed under control by a microcomputer, the saturation temperature of the gasifying agent is regulated automatically, and the generated hot gas is withdrawn out at the top of the furnace;

a burner used in steam injection boiler or heating furnace for heavy oil thermal recovery, which burner is a long cylindrical flame burner in form of a parallel flow sleeve or a combined parallel-swirling flow sleeve with hot gas in swirling flow and combustion air in parallel flow and burns the hot gas by mixing with the preheated combustion air under a vacuum; and optionally, the gas outlet of the fixed bed gas-generated furnace is connected to a dry purifying means to purify the generated hot gas; the flue gas outlet of the steam injection boiler or heating furnace is connected to a flue gas heat exchanger to preheat the combustion air with the residual heat of the flue gas; and the flue gas outlet of the flue gas heat exchanger is connected to a flue gas-discharging blower to discharge the flue gas after preheating the combustion air into a chimney at such a rate that the pressure inside the steam injection boiler or heating furnace is maintained at the vacuum.

DRAWING DESCRIPTION

Figure 2:
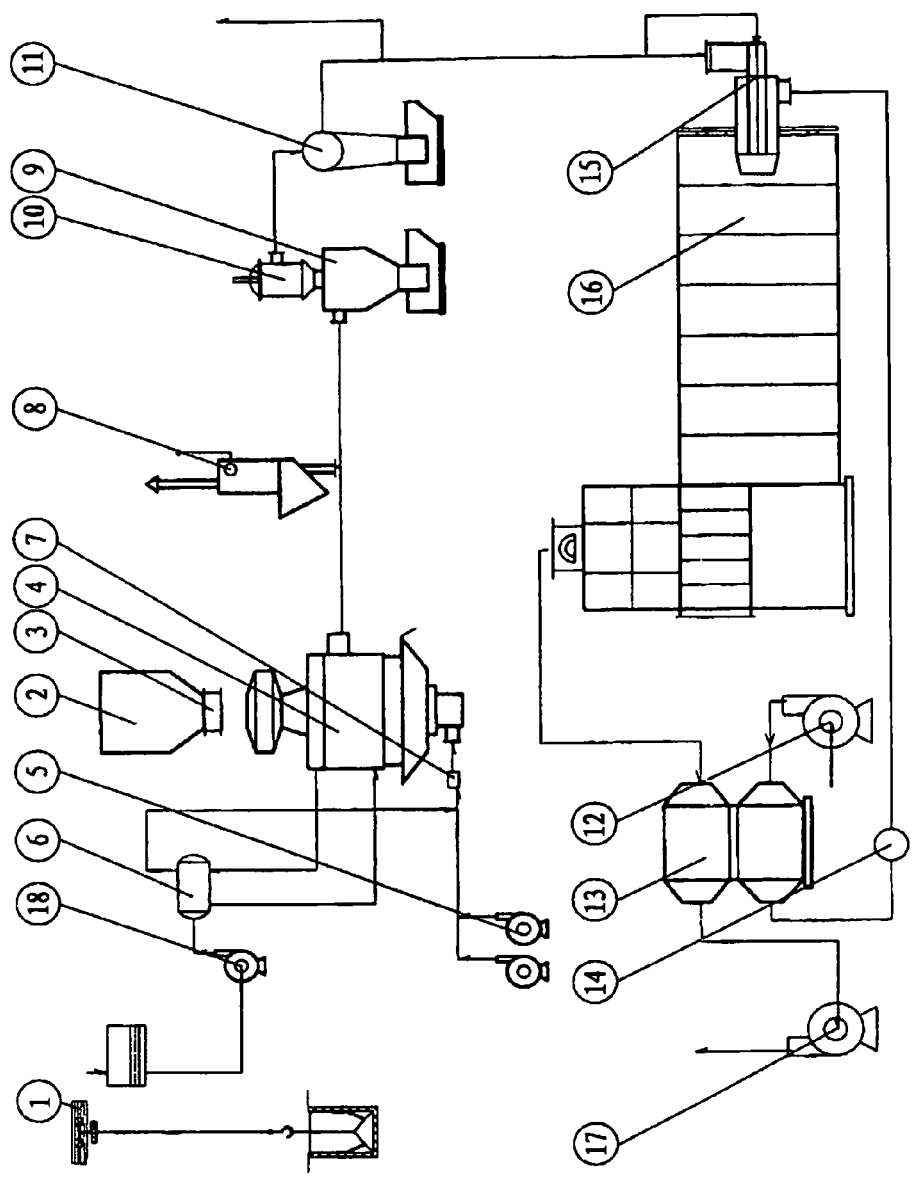

Now the present invention is further described with reference to the accompanying drawings, wherein FIG. 1 shows schematically the fixed bed gas-generated furnace during operation according to the present invention; and FIG. 2 shows schematically the flow diagram of the process for burning coal instead of oil used in the steam injection boiler or heating furnace for heavy oil thermal recovery.

DETAILED DESCRIPTION OF THE INVENTION

The present invention provides a process for burning coal instead of oil, which is particularly suitable to be used in the steam injection boiler or heating furnace for heavy oil thermal recovery, and also suitable to be used in ceramic and glass kilns as well as kilns for heat-treating metals in mechanical industry; and the present invention further provides an apparatus for burning coal instead of oil for carrying out said process.

According to the present invention, during the stage of coal gasification, the fixed bed gas-generated furnace for generating the gas is reconstructed from the well known fixed bed gas-generated furnace in the art.

Specifically, the fixed bed gas-generated furnace has a fixed furnace body, a dry furnace top, a rotary tower grate, a continuous ash-slag discharging structure with a stepless regulated rate and a water jacket covering its entire external wall, the gasifying agent is blown thereinto via a check valve at the bottom of the furnace, the feed coal for gasification is fed under control by a microcomputer, the saturation temperature of the gasifying agent is regulated automatically, and the generated hot gas is withdrawn out at the top of the furnace.

According to the present invention, the conventional fixed bed gas-generated furnace with a water jacket covering its partial external wall had been reconstructed to be with a water jacket covering its entire external wall, so that more steam can be generated for the gasifying agent and no additional boiler is needed to provide the steam any more.

During stable operation of the fixed bed gas-generated furnace, specifically referring to FIG. 1, the feed coal C is fed at the top of the furnace, the gasifying agent GA is blown at the bottom of the furnace, the gas G is withdrawn out at the top of the furnace; the total fixed bed comprises five zones from bottom to top in sequence, i.e. ash-slag zone AZ, oxidation zone OZ, gasification zone GZ, carbonization zone CZ and drying zone DZ, as well as water seal WS and ash pan AP below the ash-slag zone AZ, wherein the ash-slag zone AZ is a zone for discharging ash and slag generated in the furnace to maintain the material balance therein; the oxidation zone OZ is a zone with highest temperature in the furnace and the oxidation combustion of coal is occurred therein mainly to maintain the necessary temperature for coal gasification, and this zone can have a temperature in range of 1000-1250° C. according to the present invention; the gasification zone GZ is a main zone for generating the gas, and this zone has a temperature little lower than that of the oxidation zone and generally in range of 800-1200° C. according to the present invention; in the carbonization zone CZ the coal is thermally decomposed to generate volatile components, and this zone generally has a temperature in range of 350-800° C. according to the present invention; and the drying zone DZ mainly perform drying to remove the moisture from the coal, and this zone generally has a temperature lower than 350° C. according to the present invention.

According to the present invention, during the stage of coal gasification, the feed coal for gasification can be either a briquette produced from a fine coal or a lump coal.

The ash fusibility of the briquette can be modified by ash-slag coagulation technology. And the ash fusibility of the coal can be represented by four different temperatures, i.e. deformation temperature DT, softening temperature ST, hemispherical temperature HT and flow temperature FT.

According to the present invention, the ash fusibility of the briquette is preferably modified by the ash-slag coagulation technology so that the difference between its deformation temperature DT and softening temperature ST is in range of 150-300° C., preferably 200-250° C., and the temperature in the oxidation zone of the fixed bed gas-generated furnace is preferably regulated, for instance, by varying the saturation temperature of the gasifying agent so that it is lower than the softening temperature ST of the briquette, thus reducing the dust content of the gas. Herein, it is known to those skilled in the art to regulate the temperature in the oxidation zone of the fixed bed gas-generated furnace by varying the saturation temperature of the gasifying agent.

According to the present invention, the briquette preferably is produced by a process, in which the fine coal used as raw materials is firstly crushed to a size, e.g. less than 3 mm; and thereto a modifier of ash fusibility of coal known in the art is added at amount selected on the basis of the ash content and the ash fusibility of the fine coal so that the difference between the deformation temperature DT and the softening temperature ST of the produced briquette is in range of 150-300° C., preferably 200-250° C.; furthermore thereto a binder is added at amount of about 4-8 wt %; then the resultant blend is mixed homogeneously, and stirred to modify its moulding properties; finally a briquette with a final moisture content of less than 2.5 wt % and a compressive strength of more than 30 kg per piece is produced by moulding and drying.

According to the present invention, during the stage of coal gasification, the gasifying agent is a steam-saturated air with a saturation temperature selected on the basis of ash fusibility of coal, preferably in range of 45-65° C., more preferably in range of 50-58° C.; the gasifying agent is blown thereinto via a check valve at the bottom of the furnace; and the steam for the gasifying agent can be generated by the water jacket covering the entire external wall of the fixed bed gas-generated furnace, thus generated steam can has a pressure in range of 196-294 KPa (gauge), and can be used for steam-sealing fire detection holes on the fixed bed gas-generated furnace either, thus utilizing energy comprehensively furthermore.

According to the present invention, during the stage of coal gasification, the generated hot gas has a lower heating value in range of 5.02-6.66 MJ/Nm$^3$, specifically, when anthracite is used, the hot gas has a lower heating value in range of 5.02-5.65 MJ/Nm$^3$, and when bitumite is used, the hot gas has a lower heating value in range of 5.65-6.66 MJ/Nm$^3$, and a temperature selected above the dew point of the mixture of tar and steam therein, preferably in range of 450-650° C., more preferably in range of 500-580° C., so that to prevent clogging in gas lines and coking in the burner.

According to the present invention, during the stage of gas combustion, the burner used in steam injection boiler or heating furnace for heavy oil thermal recovery can be a long cylindrical flame burner in form of a parallel flow sleeve or a combined parallel-swirling flow sleeve with hot gas in swirling flow and combustion air in parallel flow; such a burner has a small centric passage and a outer annular passage, which can be used for the preheated combustion air, and a inner annular passage, which can be used for the hot gas, thus a stable combustion can be obtained; specifically, the burner has a long cylindrical flame with a maximum diameter of less than 2.6 m and a length up to above 5 m; when the power output of the steam injection boiler or heating furnace is equivalent to a steam production of 23 T/h, the burner can burn the hot gas at a rate of up to 27 km$^3$/h, which is far above those in the prior art.

According to the present invention, during the stage of gas combustion, the generated hot gas is introduced into the burner at an inlet pressure in range of 500-1100 Pa (gauge), preferably 700-900 Pa (gauge), and the combustion air is preheated to a temperature in range of 160-250° C., preferably 180-230° C. and then introduced into the burner at an inlet pressure in range of 1500-3000 Pa (gauge), preferably 2000-2500 Pa (gauge).

According to the present invention, during the stage of gas combustion, because the procedures of gas-cooling and pressure-increasing are eliminated prior to the hot gas is introduced into the burner, no large amount of cooled waste water comprising phenol and tar is produced, thus reducing environmental pollution and utilizing the sensible heat of the gas comprehensively with an increase of heat efficiency of about 11%; furthermore, because the hot gas being burned by mixing with a preheated combustion air, the flame temperature can be increased, so the intensity of radiation heat transfer can be enhanced, and the combustion stability of the low calorific value gas also can be increased.

According to the present invention, during the stage of gas purification, the hot gas generated in the fixed bed gas-generated furnace is introduced into a dry purifying means to be purified, wherein the dry purifying means can be a cyclone dust collector or a bag dust collector or a high voltage electrostatic dust collector.

According to the present invention, during the stage of utilization of residual heat of flue gas, the residual heat of flue gas is utilized through a flue gas heat exchanger connected to the flue gas outlet of the steam injection boiler or heating furnace, herein, the flue gas heat exchanger can be a hot-tube heat exchanger or a tubular heat exchanger, and the flue gas outlet of the steam injection boiler can be positioned at the convection section thereof.

According to the present invention, during the stage of flue gas discharge, wherein the flue gas after preheating the combustion air is discharged into a chimney via a flue gas-discharging blower at a rate, which can be regulated so that the pressure inside the steam injection boiler or heating furnace is maintained at a vacuum, for instance, at a vacuum in range of 50-150 Pa, preferably 80-120 Pa.

Now the complete operational flow diagram of the process for burning coal instead of oil according to the present invention is specifically described with reference to FIG. 2.

Specifically, referring to FIG. 2, in the preferred embodiment of the process for burning coal instead of oil according to the present invention, the briquette produced in advance firstly is transported via lifting means 1, e.g. an electric hoist, into coal bunker 2 positioned above fixed bed gas-generated furnace 4, then therefrom being fed into the furnace via stocker 3; a water jacket covering the entire external wall of fixed bed gas-generated furnace 4 is connected to steam drum 6, in which the generated steam is stored, and steam drum 6 is connected to demineralized water pump 18 to supplement the water consumed due to evaporation to steam; the air from furnace blower 5 is saturated with the steam from steam drum 6 to form the gasifying agent, which is blown thereinto via check valve 7 at the bottom of fixed bed gas-generated furnace 4; in fixed bed gas-generated furnace 4 the briquette is gasified to generate the hot low calorific value gas, which is withdrawn out at the top of the furnace, purified via purifying means 9, introduced via water-sealed valve 10 into inner-insulated hot gas line 11, and finally introduced into burner 15 used in steam injection boiler or heating furnace 16 for heavy oil thermal recovery; the combustion air is transported via combustion air blower 12 into the air inlet of flue gas heat exchanger 13 to be preheated therein, thenafter introduced into burner 15 via outer-insulated air line 14 and therein used for burning the hot gas by mixing with the same; the flue gas generated during combustion is introduced into the flue gas inlet of flue gas heat exchanger 13 to preheat the combustion air, finally, the flue gas is discharged from the flue gas outlet of flue gas heat exchanger 13 into a chimney via flue gas-discharging blower 17; when the gas-generated furnace is started up or the steam injection boiler or heating furnace is shut down, a small volume of the hot gas can be vented into atmosphere via bell valve 8.

Now the preferred embodiment of the present invention is further described by a non-limiting example.

EXAMPLE

In this example two oil-burning steam injection boilers with model No. SG50-NDS-26 made in USA were reconstructed to burn a hot low calorific value gas to carry out the process for burning coal instead of oil according to the present invention.

Specifically, in the preferred embodiment, the process for burning coal instead of oil according to the present invention is carried out in the following stages:

Briquette Production

Utilizing the fine coal with ash content of 16 wt % from Datong in China as raw materials, the same being firstly crushed to a size of less than 3 mm by an impact crusher with model No. PX-64; then thereto a modifier of ash fusibility of coal being added at amount of 3 wt %, so that the difference between the deformation temperature DT and the softening temperature ST of the briquette being of about 250° C.; thereto a binder being added at amount of 6 wt %, and the resultant blend being mixed homogeneously by a double-shaft mixer with model No. SH-10, and stirred by a vertical mixer with model No. ST-10 to modify its moulding properties, and moulded by a double-roller moulding machine with model No. CX-10 at a pressure of 450 kg/cm$^2$ to form a briquette, which being dried by a tunnel drier with model No. XM-GZ-3200-65M and then can be used in the fixed bed gas-generated furnace to generate the hot gas, the briquette having a final moisture content of 1.5 wt % and a compressive strength of 40 kg per piece;

Coal Gasification

By lifting means 1, an electric hoist with model No. MD1-3-18D and lifting capacity of 3 MT, the briquette being lifted to a square tapered coal bunker with a volume of 30 m$^3$, and being fed into ϕ3 m fixed bed gas-generated furnace 4 with model No. BZ3.0-3Q at the top thereof via a hydraulic double bell type stocker or rotary star type stocker 3 under control by a microcomputer, there being four fixed bed gas-generated furnaces in all, of which three being operated and one being stand-by and each being equipped with one coal bunker 2 and one stocker 3; the water jacket of fixed bed gas-generated furnace 4 being generating steam, which can have a pressure in range of 196-297 kPa (gauge) and being stored in ϕ1000 mm steam drum 6 connected to the water jacket, each fixed bed gas-generated furnace having one steam drum 6, which being connected to demineralized water pump 18 to supplement the water consumed due to evaporation to steam at a rate of about 600 kg/h; the air from furnace blower 5 with model No. 9-19NO11.2D being saturated with the steam from steam drum 6 to form the gasifying agent with a saturation temperature in range of 50-55° C., and there being two furnace blowers in all, of which one being operated and one being stand-by; the gasifying agent being blown thereinto via check valve 7 with model No. DN500X at the bottom of fixed bed gas-generated furnace 4, in which the briquette moving downward being contacted with the gasifying agent moving upward and being gasified to generate the hot gas, which being withdrawn out at the top of the furnace; the ash and slag generated during gasification of the briquette being discharged via a ash-slag discharging structure comprising water seal, ash pan and ash-slag plow at the bottom of the furnace; wherein the gas production can be regulated by varying the air volume from furnace blower 5 so that to provide the gas at a required volume in the steam injection boiler, and when the gas-generated furnace is started up and the steam injection boiler is shut down, a small volume of the hot gas can be vented into atmosphere via bell valve 8;

Gas Purification

After being withdrawn out at the top of the gas-generated furnace, the hot gas entering into purifying means 9, ϕ2400 mm cyclone dust collector, to be purified, the collected coal dust being discharged via a water-sealed tank at the bottom of the cyclone dust collector, and the purified hot gas being discharged via ϕ960 mm water-sealed valve 10 at the top of the cyclone dust collector, then being introduced into burner 15 of steam injection boiler 16 via ϕ1600 mm inner-insulated hot gas line 11;

Gas Combustion

When the gas production being of 18.6 MT/h, the purified hot gas having a temperature in range of 500-550° C. and a pressure in range of 700-900 Pa (gauge), and being introduced into the gas inlet, i.e. the inner annular passage of long cylindrical flame burner 15 in form of a combined parallel-swirling flow sleeve at a rate in range of 21-22.5 km$^3$/h; the combustion air being blown via combustion air blower 12, which is originally equipped to the burner with model No. 6131-G-Cr-62.5 of the steam injection boiler, into flue gas heat exchanger 13 and being preheated therein to a temperature in range of 180-230° C., then being introduced into the air inlet, i.e. the small centric passage and the outer annular passage of burner 15 via outer-insulated air line 14, and the preheated combustion air having a pressure in range of 2200-2500 Pa (gauge); wherein inside the steam injection boiler at a vacuum in range of 80-120 Pa, the hot gas being burned by mixing with the preheated combustion air to generate a flame in length of about 5 m, and the heat released during combustion being transferred via radiation section and convection section of the steam injection boiler for generating steam at elevated temperature and pressure;

Utilization of Residual Heat of Flue Gas and Flue Gas discharge

Flue gas heat exchanger 13, a hot-tube heat exchanger, being provided at the flue gas outlet of the convection section of steam injection boiler 16, the flue gas generated during combustion of the hot gas being introduced into flue gas heat exchanger 13, then being discharged into a chimney via a downstream flue gas-discharging blower 17 with model No. Y4-73-11#D, which can accommodate an increased flue gas volume as well as an increased resistance; and the combustion air being blown via combustion air blower 12 into flue gas heat exchanger 13, and being preheated therein to a temperature in range of 180-230° C. by heat exchange with the flue gas, then the preheated combustion air being introduced into burner 15 via outer-insulated air line 14; the utilization of the residual heat increasing the heat efficiency by 4-5%, so the heat efficiency of the steam injection boiler can be up to about 85.5%, which being higher than the original heat efficiency of oil-burning prior to reconstruction by about 2%.

More specifically, in comparison with that in the prior art, the present invention has the following advantages:

1. Good reliability, in order to carry out the inventive process, all of the main devices and the accessories of the steam injection boiler or heating furnace for heavy oil thermal recovery in the prior art can be keep unchanged, only the oil- or natural gas-burning burner needs to be replaced with the burner of the present invention; furthermore, no problem in connection with ash-slag discharge is occurred, so that the reliability and the safety are ensured.

2. Low cost and wide range of sources of fuels, according to the present invention, the gas is generated with a briquette, of which the price is less than that of oil and natural gas by about four-fifths, and less than that of the usual lump coal by 20-30%; and the briquette of the present invention can be produced from a fine coal from many sources.

3. High heat efficiency, because being burned directly without cooling, the sensible heat of the hot gas of the present invention is utilized sufficiently; furthermore, because both the hot gas and the preheated combustion air are hot, the water jacket of the gas-generated furnace can collect more heat to generate steam for the gasifying agent, so that no additional boiler is needed any more; the "modified briquette" further increases the "gasification efficiency", and a flue gas heat exchanger is provided to utilize the residual heat of the flue gas; thus, in comparison with the prior oil-burning technology, provided that the power output of the steam injection boiler or heating furnace being not reduced, the heat efficiency of the present invention is increased by 2-4%, and in comparison with the prior technology for burning low calorific value gas, the heat efficiency of the present invention is increased by about 17%, so the process for burning coal instead of oil according to the present invention has a significantly increased heat efficiency.

4. Simple process and low investment, the present invention can be carried out in the system of steam injection boiler or heating furnace in the prior art with its burner being replaced only, and the added portion of flow diagram for generating the hot low calorific value gas is shorter than that of the prior ones for burning cold gas by half or more, thus, both of the investment and the gas cost are reduced significantly.

5. Beneficial to environmental protection, the hot low calorific value gas of the present invention has a temperature higher than the dew point of the mixture of tar and steam therein and is not cooled, so no waste water comprising phenol and tar is produced; and the briquette produced by ash-slag coagulation technology reduces the contaminant particulate in the flue gas, increases the systematic heat efficiency, and reduces the consumption of coal and the emission of $CO_2$; thus being beneficial to the environmental protection.

The invention claimed is:

1. A process for burning coal instead of oil comprising the following stages:

coal gasification, wherein feeding coal and gasifying agent into a fixed bed gas-generated furnace and gasifying the coal to generate a hot low calorific value gas having a lower heating value in range of 5.02-6.66 $MJ/Nm^3$, when anthracite is used, the hot gas has a lower heating value in range of 5.02-5.65 $MJ/Nm^3$, and when bitumite is used, the hot gas has a lower heating value in range of 5.65-6.66 $MJ/Nm^3$, and a temperature selected above the dew point of the mixture of tar and steam therein, and the gasifying agent is a steam-saturated air, and wherein the coal is a briquette produced from a fine coal, the ash fusibility of the briquette is modified by ash-slag coagulation so that the difference between its deformation temperature DT and softening temperature ST is in range of 150-300° C., and the temperature in the oxidation zone of the fixed bed gas-generated furnace is regulated by varying the saturation temperature of the gasifying agent so that it is lower than the softening temperature ST of the briquette, thus reducing the dust content of the gas; and gas combustion, wherein introducing the generated hot gas into a burner used in steam injection boiler or heating furnace for heavy oil thermal recovery and burning the hot gas therein under a vacuum in range of 50-150 Pa, by mixing with a combustion air, which is introduced into said burner after being preheated to a temperature in range of 160-250° C.

2. The process according to claim 1, further comprising the following stages:

gas purification, wherein the hot gas generated in the fixed bed gas-generated furnace is introduced into a dry purifying means to be purified and then introduced into the burner to be burned;

utilization of residual heat of flue gas, wherein the flue gas generated during combustion in the burner is introduced into a flue gas heat exchanger to preheat the combustion air with the residual heat of the flue gas; and flue gas discharge, wherein the flue gas after preheating the combustion air is discharged into a chimney via a flue gas-discharging blower at such a rate that the pressure inside the steam injection boiler or heating furnace is maintained at the vacuum.

3. The process according to claim 1, wherein the ash fusibility of the briquette is modified by ash-slag coagulation technology so that the difference between its deformation temperature DT and softening temperature ST is in range of 200-250° C.

4. The process according to claim 3, wherein the saturation temperature of the gasifying agent is selected in range of 45-65° C. based on the ash fusibility of the coal.

5. The process according to claim 4, wherein the saturation temperature of the gasifying agent is selected in range of 50-58° C. based on the ash fusibility of the coal.

6. The process according to claim 3, wherein the fixed bed gas-generated furnace is equipped with a water jacket covering its entire external wall and the steam generated in the water jacket is used for the gasifying agent.

7. The process according to claim 3, wherein the feed coal for gasification is transported via a lifting means to a coal bunker positioned above the fixed bed gas-generated furnace and therefrom fed into the furnace via a stoker, and the gasifying agent is blown thereinto via a check valve at the bottom of the furnace.

8. The process according to claim 3, wherein the temperature of the hot gas is selected in range of 450-650° C., the hot gas is introduced into the burner at an inlet pressure in range of 500-1100 Pa (gauge), and the preheated combustion air is introduced into the burner at an inlet pressure in range of 1500-3000 Pa (gauge).

9. The process according to claim 8, wherein the preheated combustion air is fed into the small centric passage and the outer annular passage of the burner and the hot gas is fed into the inner annular passage of the burner.

10. The process according to claim 3, wherein the burner is a long cylindrical flame burner in form of a parallel flow sleeve or a combined parallel-swirling flow sleeve with hot gas in swirling flow and combustion air in parallel flow.

11. The process according to claim 8, wherein the temperature of the hot gas is selected in range of 500-580° C., the hot gas is introduced into the burner at an inlet pressure in range of 700-900 Pa (gauge), and the preheated combustion air is introduced into the burner at an inlet pressure in range of 2000-2500Pa (gauge).

12. The process according to claim 3, wherein the dry purifying means is a cyclone dust collector or a bag dust collector or a high voltage electrostatic dust collector, and the flue gas heat exchanger is a hot-tube heat exchanger or a tubular heat exchanger.

13. The process according to claim 1, wherein the vacuum for burning the hot gas is in range of 80-120 Pa, and the combustion air was preheated to a temperature in range of 180-230° C.

* * * * *